UNITED STATES PATENT OFFICE.

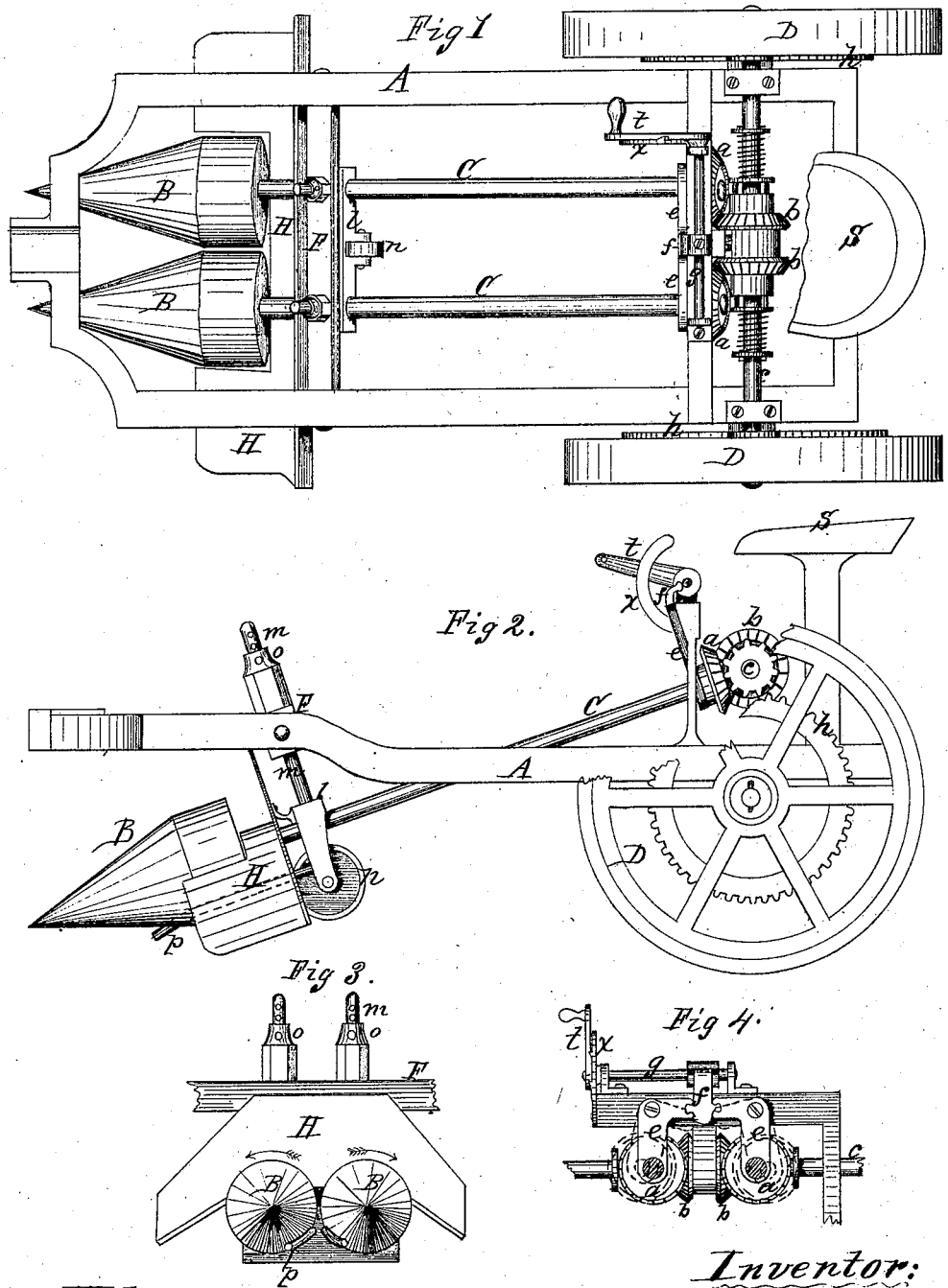

LEANDER BERRY, OF CLYDE, NEW YORK, ASSIGNOR TO HIMSELF AND EDWARD BURRELL, OF SAME PLACE.

IMPROVEMENT IN VINE-PULLERS FOR POTATO-DIGGERS, &c.

Specification forming part of Letters Patent No. 107,328, dated September 13, 1870.

*To all whom it may concern:*

Be it known that I, LEANDER BERRY, of Clyde, in the county of Wayne and State of New York, have invented certain Improvements in Vine-Pullers for Potato-Diggers, of which the following is a specification.

My invention relates, chiefly, to the employment of one or more pairs of conical rollers in a bean or vine pulling machine, between which the plants are caught, and by the revolution of which they are lifted from the soil.

In the drawings, Figure 1 is a plan view of my invention. Fig. 2 is a side elevation. Fig. 3 is a front view of the pulling device. Fig. 4 is an elevation of the apparatus for throwing the rollers out of gear.

My invention is adapted to pulling beans, potato-vines, flax, or other similar plants, but is more particularly intended to be attached to a potato-digger to precede the excavating-shovel.

The conical rollers B, Figs. 1, 2, and 3, are located near the forward end of the machine upon inclined shafts C, and are revolved in the direction indicated by the arrows, Fig. 3, by means of the gears $a$ and $b$ and transverse shaft $c$, which latter is in turn actuated by the spur-wheels $h$ upon the ground-wheels. The upper ends of the shafts C are suspended in the vertical arms of the bell-cranks $e$, Fig. 4, which are pivoted to a suitable part of the frame of the machine, and the lower ends have bearings in the vertically-yielding frame $l$. The inclination of these shafts is such, with relation to the taper of the rollers B, that the lower face line of the latter lies nearly or quite horizontally, as indicated in Fig. 2.

The frame $l$ is provided with guides $m$, which are fitted to slide in ways prepared in or upon the cross-girt F. Collars $o$, which are adjustable upon the guides $m$, above the girt F, in any convenient manner, regulate the vertical position of the pulling-rollers, and at the same time allow them to rise to pass obstructions or uneven ground. The girt F is pivoted to the frame A of the machine, whereby it is allowed a slight oscillation as the frame $l$ moves vertically. The ground-wheel $n$ has bearings upon the frame $l$, being arranged to follow the surface of the ground, and thus retain the rollers B in a proper position with relation to the plants.

A combined chute and guard, H, is attached to the frame $l$, immediately to the rear of the rollers, and extends some distance above and each side of them, as shown. This chute conducts the vines to one or both sides, out of the track of the machine, thus preventing the shelling of beans or similar seeds by the ground wheels, and when used in connection with a potato-digger obviating the danger of clogging the digging apparatus in the rear.

Stiff rods or arms $p$ are attached to the frame $l$, just below the rollers B, which extend some distance forward, and are bent slightly outward, so as to gather the stocks and roots of the vines. As the latter are pulled up by the action of the rollers, the fork $p$ strips off the potatoes which may cling to the roots.

The horizontal arms of the bell-cranks $e$ are connected by a link, $f$, to an arm of the rock-shaft $g$, to which is attached the lever $t$. The latter is arranged in convenient proximity to the operator occupying the seat S, and its axial adjustment is secured by the notched segment $x$, made fast to the frame of the machine. A downward movement of the lever $t$ shifts the bell-cranks and gears, as shown in dotted lines in Fig. 4.

It is obvious that as this machine moves along in the field any vines or plants which may lie in the track of the rollers B, being forced into the conical space between the rollers, are uprooted by the motion of the latter in the direction indicated, while the vines are conducted away by the chute H, and in the case of potatoes those clinging to the roots are stripped off and left upon the hill.

What I claim as my invention is—

1. In combination with the pulling-rollers B, the clearing-guard H, arranged to operate substantially as set forth.

2. The vertically-adjusting frame $l$, in combination with the rollers B and their supporting-shafts, when provided with the gage-roller $n$, for the purposes set forth.

3. In combination with the roller-shafts C, the bell-cranks $e$, links $f$, rock-shaft $g$, and lever $t$, arranged and operating substantially as herein set forth.

4. In combination with the conical pulling-rollers B, the stripping-fork $p$, arranged to operate substantially as set forth.

LEANDER BERRY.

Witnesses:
DANL. L. JOHNSTON,
F. H. CLEMENT.